(No Model.) 6 Sheets—Sheet 3.
A. B. FARQUHAR, H. W. EISENHART & S. S. MORTON.
MACHINE FOR THRASHING AND SEPARATING GRAIN.
No. 480,660. Patented Aug. 9, 1892.
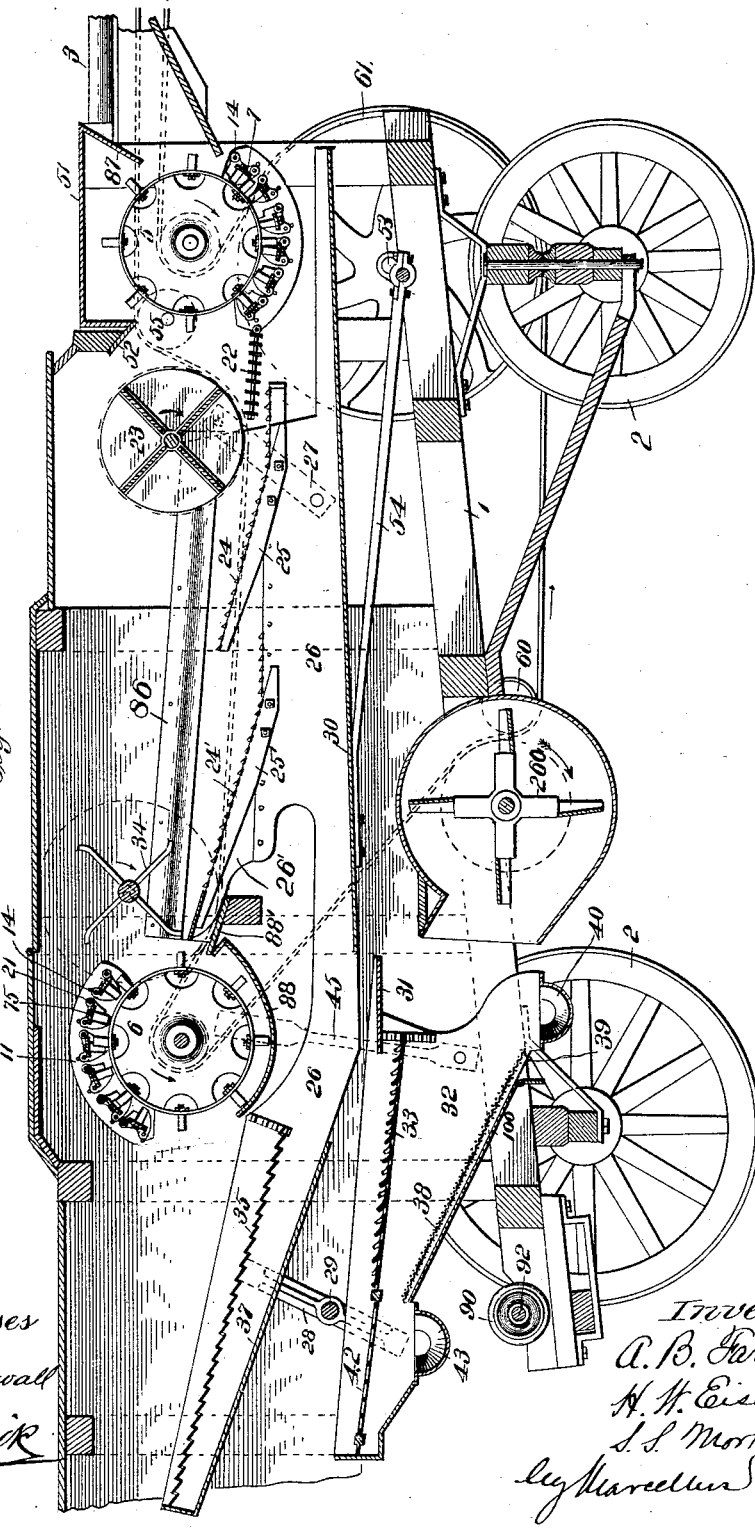

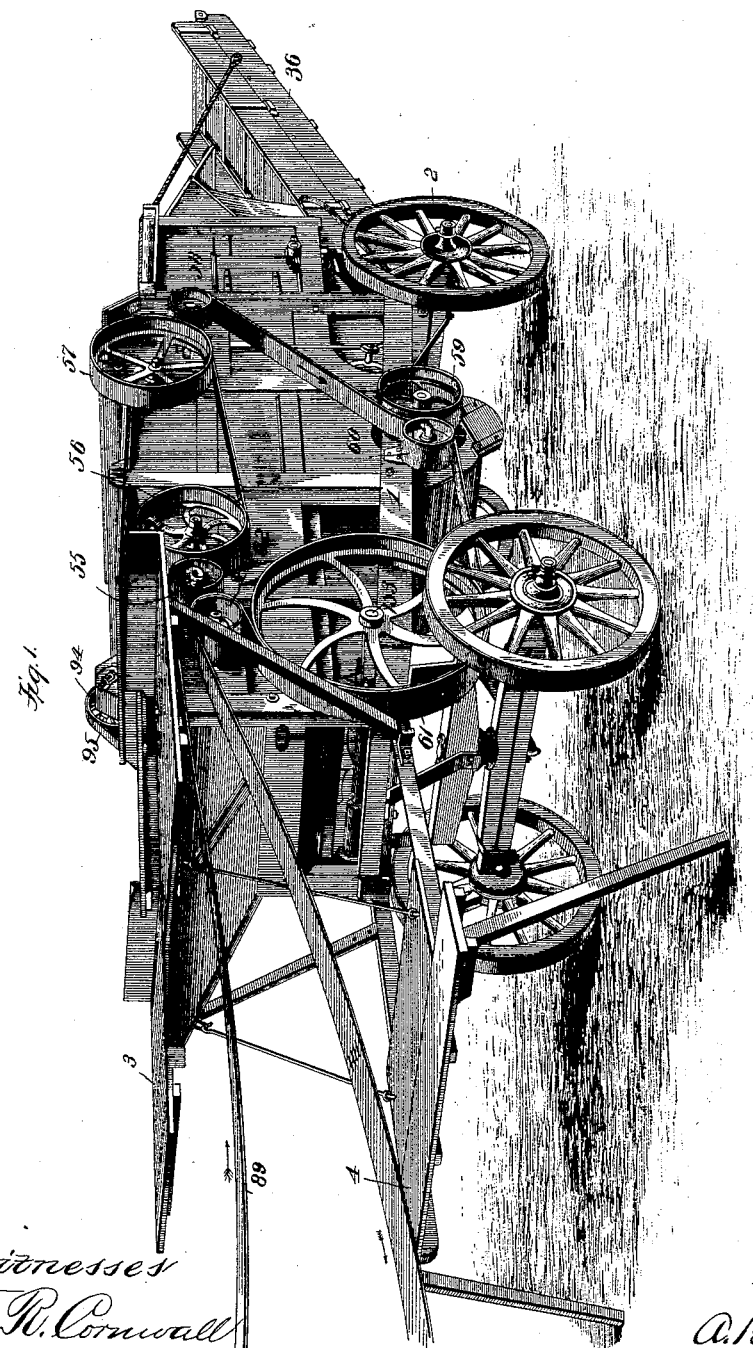

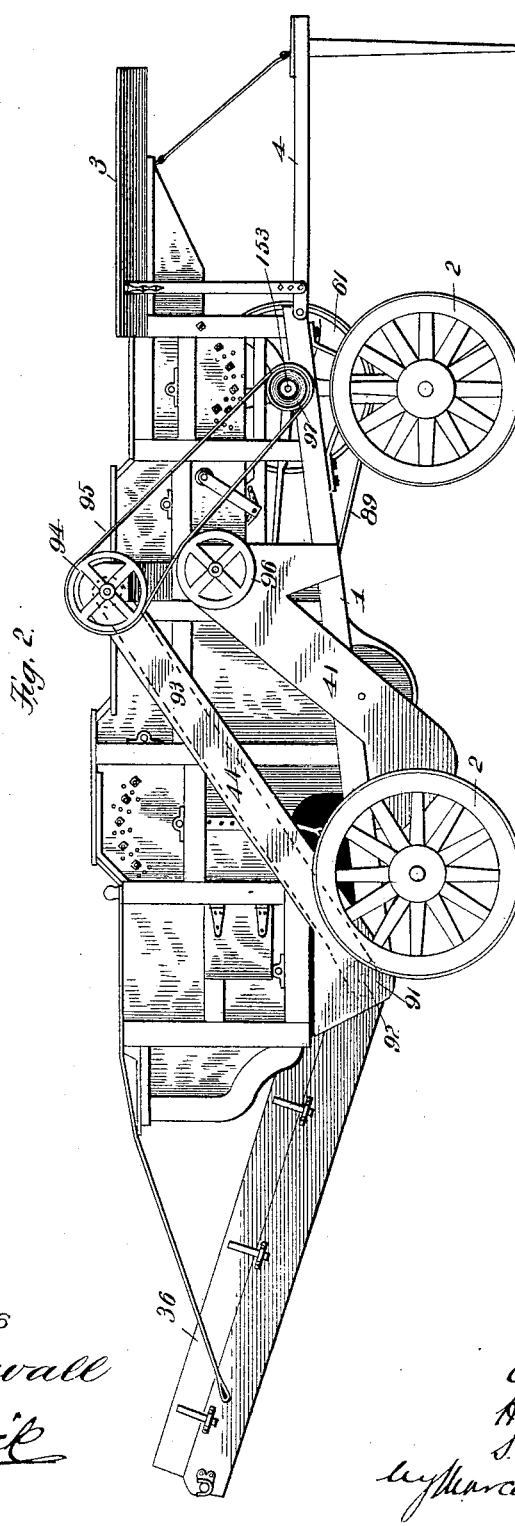

(No Model.) 6 Sheets—Sheet 4.
A. B. FARQUHAR, H. W. EISENHART & S. S. MORTON.
MACHINE FOR THRASHING AND SEPARATING GRAIN.
No. 480,660. Patented Aug. 9, 1892.
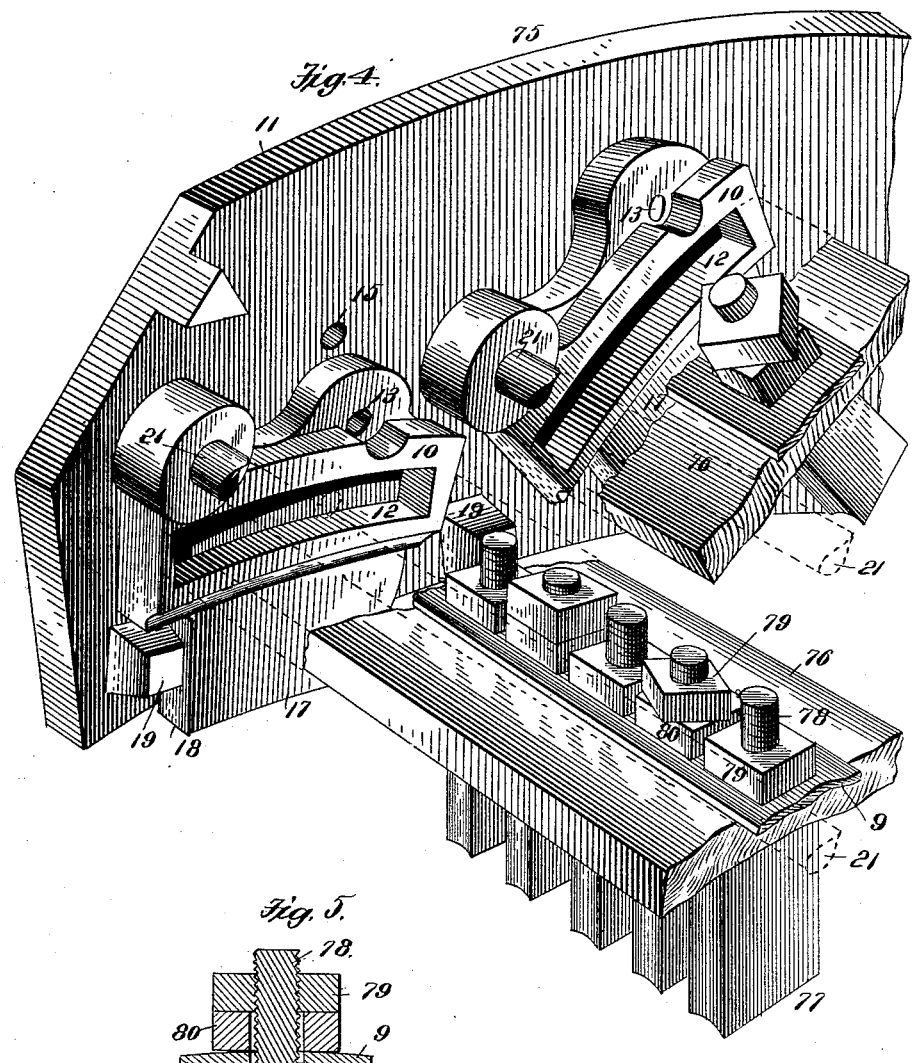

(No Model.) 6 Sheets—Sheet 5.
A. B. FARQUHAR, H. W. EISENHART & S. S. MORTON.
MACHINE FOR THRASHING AND SEPARATING GRAIN.
No. 480,660. Patented Aug. 9, 1892.
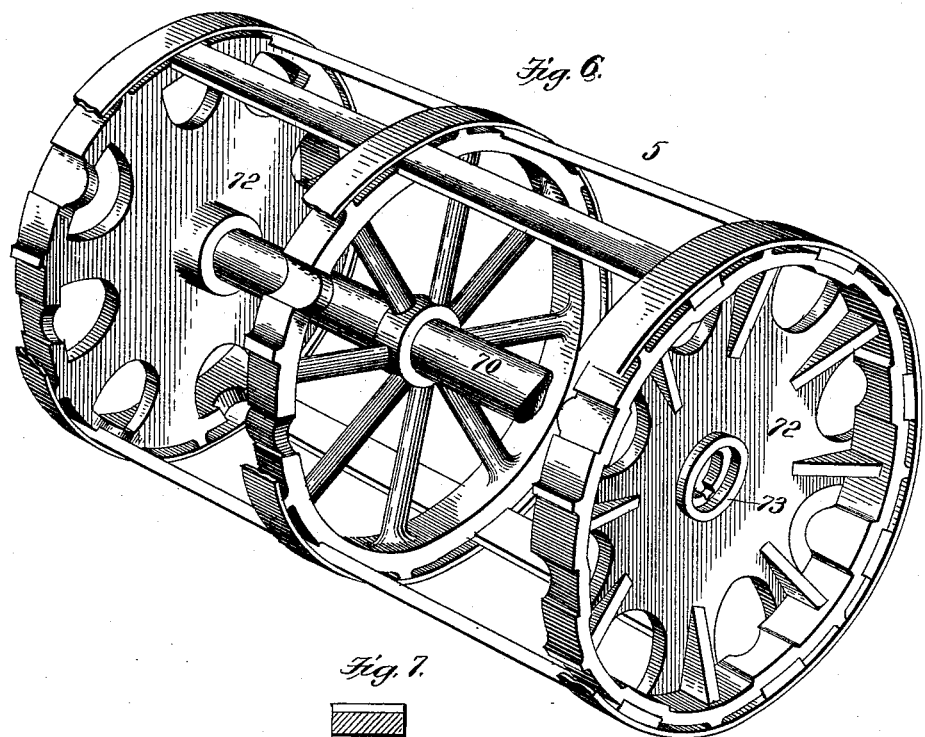
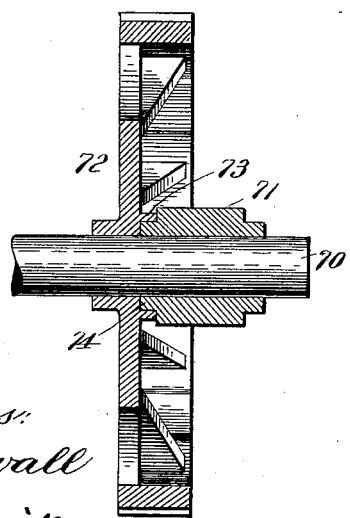
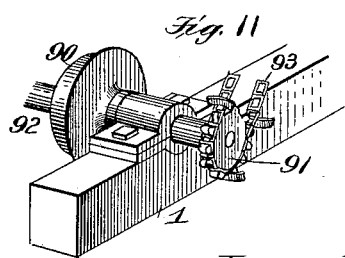

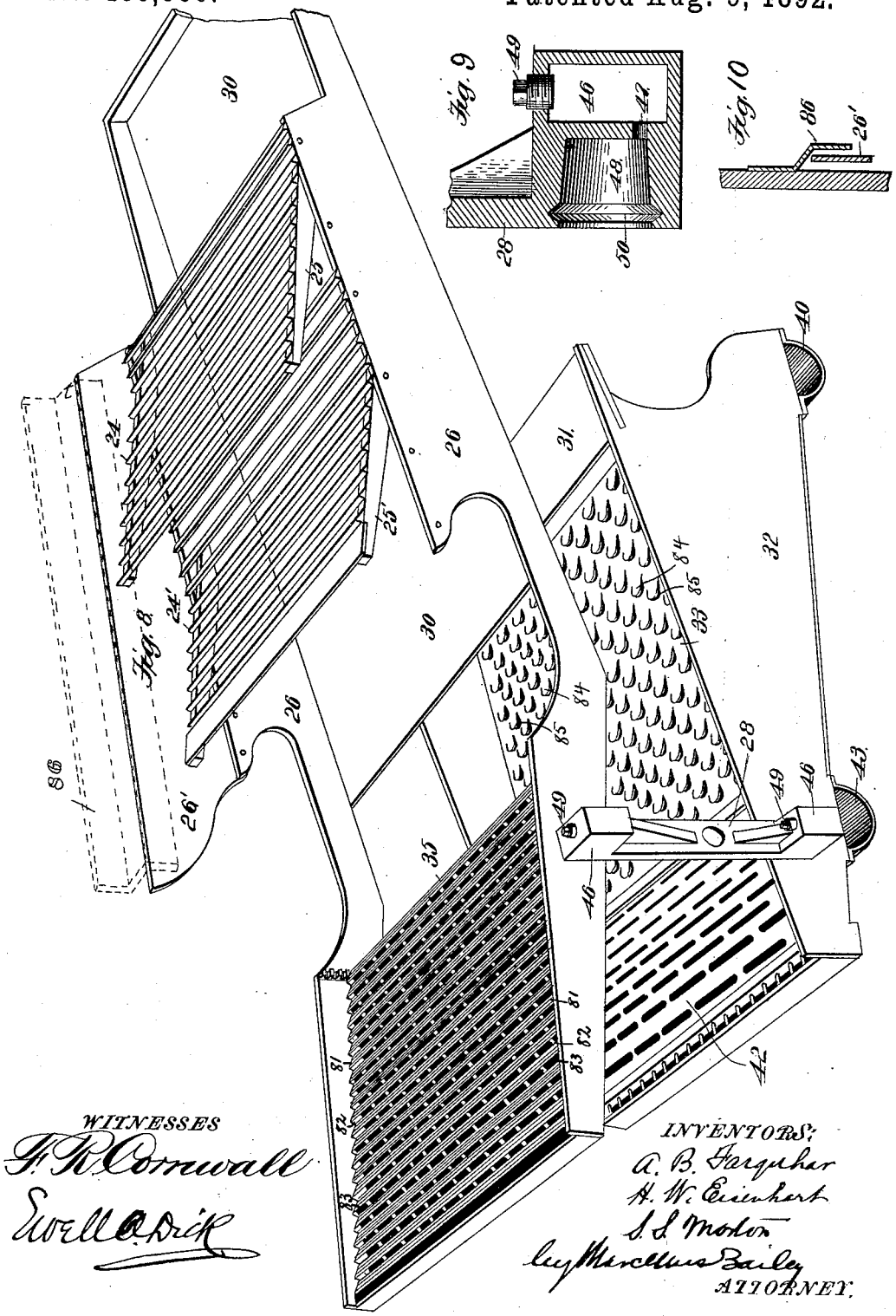

UNITED STATES PATENT OFFICE.

ARTHUR B. FARQUHAR, HENRY W. EISENHART, AND SAMUEL S. MORTON, OF YORK, PENNSYLVANIA.

MACHINE FOR THRASHING AND SEPARATING GRAIN.

SPECIFICATION forming part of Letters Patent No. 480,660, dated August 9, 1892.

Application filed November 14, 1891. Serial No. 411,878. (No model.)

*To all whom it may concern:*

Be it known that we, ARTHUR B. FARQUHAR, HENRY W. EISENHART, and SAMUEL S. MORTON, of York, in the county of York, State of Pennsylvania, have invented certain new and useful Improvements in Machines for Thrashing and Separating Grain, of which the following is a specification.

Our invention has for its object to improve machines for the thrashing and separating of grain; and it consists in improvements in various features of such machines, particularly in the combinations and arrangement of parts hereinafter pointed out and claimed.

In order that our invention may be the better understood, we have shown it embodied in a thrashing and separating machine which is illustrated in the accompanying drawings, wherein—

Figure 1 is a perspective view of the entire machine, as seen from the side on which the belt is arranged. Fig. 2 is a side elevation of the machine, showing the side opposite to that seen in Fig. 1. Fig. 3 is a longitudinal vertical section of the machine. Fig. 4 is a perspective view, partly broken away and considerably enlarged, of a portion of the concave of the rear cylinder. Fig. 5 is a cross-section through one of the teeth of the concave and its supports. Fig. 6 is a perspective view, parts being broken away, of the cylinder, the teeth not being shown. Fig. 7 is a vertical section through one of the heads of such cylinder. Fig. 8 is a perspective view of the screens and their supporting-frames. Fig. 9 is a vertical section through the bearing in the rock-arms 28 for the journal of one of the screens. Fig. 10 is a vertical section through one of the side boards 26 and the hood which directs the thrashed straw to the straw-carrier. Fig. 11 is a detached view in perspective, showing the means for actuating the straw-carrier by the use of the tailings-elevator chain.

Referring to the drawings, 1 represents the frame of the machine, 2 the supporting or ground wheels, 3 the feed-table at the front end of the machine, and 4 the platform, these parts being of any usual or preferred construction.

5 designates the receiving-cylinder, to which the straw is fed directly upon entering the machine, it being of usual construction, except in the particulars hereinafter referred to.

70 indicates the shaft upon which the cylinder is mounted, and 71, Fig. 7, the journal box or bearing in which the shaft turns.

72 is the head of the cylinder provided with a flange or circular rim 73, projecting outward from the face thereof and surrounding the opening through which the shaft 70 passes, and when the cylinder is in place in the machine overlying a reduced portion 74 of the journal, thereby constituting a sand-band which prevents the dust and dirt that may enter the cylinder from working into the bearing. This construction enables the cylinder to be mounted close up to the bearing. It will be understood that there is one such sand-band at each end of the cylinder.

6 designates the rear or what we term the "masticating" cylinder, situated in the rear portion of the machine, this cylinder being substantially like the cylinder 5, except that its teeth are arranged nearer to each other in order that it may thoroughly break up the straw before it passes out of the machine.

The concave 7 of the forward cylinder 5 is so arranged below the cylinder, while the concave 75 of the rear or masticating cylinder is arranged above its cylinder. Except as to the differences in arrangement and the closeness of the set of teeth, these two concaves are alike and the description of one will suffice for both. Each concave is made up of a plurality of independently-mounted transverse sections, each section consisting of a transverse tooth-carrying bar independently mounted between the side plates 11 of the concave and the accessory parts to be described.

We will now refer particularly to Figs. 4 and 5, where a portion of the concave 75 is shown. 76 represent the bars upon which are supported the teeth 77 of the concave. The screw-threaded shanks or stems 78 of the teeth pass through the bar 76 and through a thin strip or liner 9 upon the outer face thereof and are held in place by the nuts 79. Upon the stem 78 of each alternate tooth are placed the blank nuts 80, which do not engage therewith, but serve as spacing-pieces to elevate the alternate nuts 79, this arrangement being to facilitate the use of a wrench upon the various nuts 79. Each tooth-supporting bar or plate 76 at each end enters a groove 12, formed in a pivoted, supporting or carrier plate 10, a series of these plates at each side of the machine being arranged on a curved line and connected to the side plates 11, which latter are secured to the side frame pieces of the machine.

21 are rods which extend between the plates 11 and upon which the supporting-plates 10 for the tooth-bars are hinged or pivoted. Each rod 21 passes through an aperture formed in one of the outer corners of each supporting-plate 10, the other outer corner of the plate being perforated at 13 to receive a wooden or other breakable pin 14, which passes into an aperture 15 in the side plate 11, and it is by these parts—the rod 21 and the pin 15—that the concave teeth and their supporting parts are held in working position. The pin 14 is strong enough to hold the set of teeth carried by the bar 76 in position for the ordinary working of the machine; but should some hard foreign substance—such as stone or piece of wood of such size that it will not pass between the cylinder and concave when they are in ordinary working position—be fed into the machine along with the straw the pins 14 will be broken, allowing the teeth and their supporting parts to swing away from the cylinder about the pivots 21. By this means the breaking of the teeth, either upon the cylinder or in the concave, is prevented.

19 designates a lug upon the plate 11, situated in such position that it will stop the supporting-carrier 10 from moving too far when it is supported by the rod 21, only that is in the concave 75. This lug prevents the set of concave teeth from falling down so far that the teeth on the cylinder 6 will strike the bar 76. We prefer to extend the pivoted carrier-plate 10, as at 17, so that it will engage with this lug, the carrier being cut away, as at 18, this shaping of the parts being found most desirable.

It will be understood that the teeth of the concave 7, situated below the first cylinder 5, together with their supporting parts, will fall away by gravity from the cylinder should their supporting-pins 14 be broken, as described, thus forming a free passage for any unyielding foreign substance. On the other hand, the teeth and their supporting parts of the concave 75, which is situated above the rear cylinder 6, will when a large-sized hard foreign substance enters between them and cylinder-teeth be moved away from the cylinder, breaking the pins 14 by reason of the pressure of such substance under the influence of the cylinder.

It will be observed from an examination of Fig. 3 that the pivoted supports 21 of the concave teeth in both of the concaves 7 and 75 are arranged in front of the breakable pins 14—that is to say, they are so arranged that the teeth of the cylinders pass them, (the pivotal supports 21,) before they pass the pins 14. The straw and grain having passed the first cylinder is received upon a grating 22, from whence such portions as do not fall through the grating upon the bottom 30 of the shaking screen are taken by the beater 23 and carried rearward to the first of the rocking or shaking screens 24. The shaking screens are supported in a frame consisting of the side boards 26 and the bottom boards 30 and 37. This frame is at its forward end hung upon the hangers 27 and is supported at its rear end by the rocking arms 28, which are mounted upon the shaft 29, extending across the machine, being supported in the said frame-pieces thereof. Between the beater 23, which is so constructed as to operate also as a fan, and the beater 34, which is situated in front of the rear or masticating cylinder 6, are arranged two screen-surfaces 24 and 24', formed by slats extending between the side pieces of the shaking frame and between the inclined arms 25 and 25', as clearly shown in Figs. 3 and 8. The beater 34 takes the straw from the screen 24' and feeds it to the masticating-cylinder, from whence it is delivered in a finely-broken-up condition to the rear upper screen 35, over which the lighter material—such as the straw, chaff, &c.—passes to the straw-carrier 36 at the rear of the machine, while the grain falls through this screen upon the bottom board 37.

The screening-surface 35 is constructed, preferably, of a sheet of metal shaped into zigzag form to constitute the longer upper sloping surfaces 81 and the abrupt downward-extended surfaces 82. The greater portions of the parts 82 of the screen are cut away to form openings 83, through which the grain freely passes to the platform or bottom 37. A screening-surface of this construction possesses marked advantages in that it is easily constructed and facilitates the feeding of the lighter material delivered to it from the cylinder 6 out of the machine, as the short abrupt downward-extending step portions 82 of the screen catch such material and hold it from moving forward, although the screen as a whole is inclined upward toward the rear, and at the same time insuring the separation of the straw, shaff, and other light materials from the heavier substances—such as the grain—coming to it from the cylinder, as these heavier substances fall into the angles or troughs formed between the portions 81 and 82 of the screen, whence they readily find their way through the openings 83 to the bottom board 37.

32 32 represent the side boards of another vibratory or shaking screen-frame, which is situated below the upper shaking screen-frame. It is hung at its forward end upon the yielding or the elastic arms 45, and at its rear end upon the vibrating arms 28, which connect it with the upper screen-frame. The pivotal supports for the arms 28 being situated between the ends thereof, cause the upper and lower screen-frames to vibrate simultaneously, but in the opposite directions. This lower shaking screen-frame is arranged below the opening between the bottom boards 30 and 37 of the upper screen-frame, so that the grain and other material which falls upon these bottom boards is finally delivered to the screens in this lower shaking frame.

31 is a plate or band placed at the forward end of the lower screen-plate to catch whatever material falls off the lower end of the bottom 30 and deliver it to the screening-surface 33 in the lower frame. The material from the bottom board 37 delivers directly upon the said screen 33. This screen 33 consists of a plate of metal which is punched so as to form a series of lips 84, which are raised as shown in Fig. 8, thereby forming a series of apertures 85, through which the grain and heavier material falls, while the lighter material—such as chaff—rests upon the screen 33, and by reason of the direction in which the lips 84 point is fed toward the rear of the machine.

42 is a screen of coarse mesh arranged in rear of the screen 33. It permits any heads of unthrashed grain which may have passed thus far through the machine to fall through it into the spout 43, by which they are conveyed to the tailings-elevator 44, which in turn delivers them back upon the slatted screen 24 to be again passed through the machine. The grain and other material which passes through the screen 33 falls upon a screen 38 of very fine mesh, where all sand, grit, and like small matter is separated from it. This fine material falls upon a bottom board 100 and thence out of the machine through the opening 39, while the cleaned grain passes over the end of the screen 38 into the spout 40, which delivers it to the elevator 41, which in turn conveys it to the bags.

From the time the thrashed grain leaves the bottom-boards 30 and 37 it is subjected to a blast of air from a fan 260, which carries away all light material, as will be understood from an examination of Fig. 3.

The vibrating screen-frames receive their motion from a crank 53 on the shaft 153, such crank being connected by the pitman 54 with the upper vibratory or shaking screen-frame. Motion being imparted to this screen-frame, it rocks the arms 28, which in turn vibrate the lower screen-frame 32. The opposite ends of the arms 28 are provided with bearings 48, (see Figs. 8 and 9,) in which the journals extending from the side pieces of the two screen-frames are mounted. Outside of these journal-bearings and connected therewith by ports 47 are oil-reservoirs 46. 49 represent the plugs which close the filling-openings into the oil-chambers 46.

50 is a groove on the inside of the journal-bearing near its outer edge, adapted to receive packing material to retain oil in the bearings. It will be observed that the bearings are tapered or cone-shaped, thus permitting them to be adjusted upon the studs or journals which enter them in order to take up with wear.

86 represents hood or shield pieces secured to the inside of the frame or casing of the machine, and arranged so as to overlie and hang over the extension-boards 26' of the side boards 26 of the upper shaking screen. These shield-pieces operate to direct the delivery of the straw from the beater 23 to the rear cylinder 6 and prevent scattering of the straw, and also prevent it from working down between the casing and the upper screen-frame. These hood or shield pieces are shown in Figs. 3, 8, and 10. In Fig. 8 the screen is shown as having the extension-board 26' removed from the near side in order to better show the screening-surfaces 24 and 24'.

51 is a cap or cover arranged in the top of the machine above the front cylinder 5. At its forward end it has a downward-extending plate 87, which serves as a guide and deflecting board to the better direct the straw to the cylinder, and more especially to direct the current of air which enters the forward end of the machine, being induced by the fan 23, so concentrating such current of air that it accelerates and directs the motion of the straw and prevents its being scattered, as it would be were such current not properly concentrated and given the right direction.

52 is a scraper arranged in rear of and near the upper portion of the cylinder 5, and at such distance therefrom that its teeth just escape the edge thereof. It serves to remove any straw which might tend to wind upon the cylinder, and thus clog and interfere with its action.

In combination with the rear cylinder and concave, we also prefer to employ a blast concentrating and directing device. This consists of a curved plate 88, arranged under the cylinder, and a wind or guide board 88', joining the plate 88 at its front edge at an angle. As will be understood, this arrangement directs the blast of air passing through the machine from the fan 23 entirely to the upper part of the cylinder, so that the straw cannot be moved against the forward-moving teeth on the lower side of the cylinder, to be by them scattered forward through the machine. The plate 88 also prevents the cylinder from scattering straw and chaff upon the lower screens and the bottom board 30, and its forward edge serves to remove straw which might tend to wind upon the scraper.

Motion is imparted to all of the parts described by means of a single belt 89, the course of which is indicated in Figs. 1 and 3. The belt in its passage toward the machine first engages with an idler-pulley 55, which directs the belt so that it passes under the pulley 56, comparatively large, on the shaft of the beater and fan 23, which is thereby caused to rotate in the direction of the arrow shown in Fig. 3. Thence the belt passes rearward and next engages with the under surface of the large pulley 57 on the shaft of the beater 34, whence it passes over and around the small pulley 58 on the end of the rear masticating-cylinder 6, these parts being driven in the directions intimated by the arrows in Fig. 3. The belt turns toward the forward end of the machine at the pulley 58, and passing downward engages with the upper surface of the pulley 59 on the shaft of the fan 260, and with the rear lower face of the idler 60, whence it passes forward and engages with the front face of the large wheel 61 on the shaft 153, on which is arranged the crank 53, from which the shaking screen-frames receive their motion. From the wheel 61 the belt passes upward and around the rear face of the small pulley 62 on the shaft of the first cylinder, whence it returns to the motor.

97 is a pulley on the crank-shaft 153, situated on the side of the machine opposite the wheel 61, and this pulley drives a belt 95, which engages with and drives the pulleys 94 and 96 upon the shafts of the wheels which respectively operate the tailings-elevator 44 and the grain-elevator 41. The tailings-elevator 93 passes around a sprocket-wheel 91, Figs. 2 and 11, on the shaft 92, on which is situated the turning wheel or drum 90 for the straw-carrier 36.

The operation of our machine will be manifest from the above description of the various parts and their respective functions, and need not therefore be given in detail. So, too, the advantages which are incident to the various novel features of our machine have been referred to in the detail description thereof, and these need not therefore be again set forth.

Having thus described the preferred embodiment of our invention, but not wishing to be limited to the precise construction and arrangement of parts shown, what we claim is—

1. The combination of the cylinder having its head provided with a projecting annular flange, and the bearing in which the cylinder-shaft turns having a reduced portion, over which the said flange projects, and thereby constitutes a sand-band or dust-guard for the bearing, substantially as described.

2. In combination with a cylinder, a concave having a section carrying a transversely-arranged set of teeth mounted on pivotal supports in the side pieces of the concave, a breakable support which holds the said section in working position, and a stop which limits the movement of the said section after the said breakable support is broken, substantially as described.

3. In a thrashing-machine, the combination, with a cylinder, of a concave having independent teeth-carrying sections, each having pivotal supports and breakable supporting-pins, the said pivotal supports being arranged in front of the said pins, substantially as described.

4. In a thrashing-machine, the combination, with a cylinder, of a concave arranged above the cylinder and having a series of teeth-carrying sections, the rods 21, upon which the sections are pivotally supported, the breakable pins 14, and the stops 19, which limit the movement of the teeth-sections toward the cylinder in the event of a pin 14 breaking, substantially as described.

5. In a separating-machine, the combination, with the screen having a journal projecting therefrom, of a rock-arm provided with a bearing 48 for the journal and with an oil-chamber 46, which is separated from the bearing by a perforated partition, substantially as described.

6. In a grain thrashing and separating machine, the combination of the first cylinder and concave, the rear cylinder and concave, the upper screen situated between the said two cylinders, the screen 35 in rear of the rear cylinder, and the bottom boards 30 and 37 under these said screens, respectively, and inclining toward each other, the lower screen-carrying frame arranged to receive the materials delivered upon the bottom boards 30 and 37, the blast-fan 260, which directs a blast of air to the material upon the lower frame and against the material as it falls from the boards 30 and 37, and means for vibrating the said screens, substantially as described.

7. In a thrashing-machine, the combination, with a cylinder and concave, of a blast-fan and a deflecting-board which directs and concentrates the blast caused by the fan to the operative portion of the cylinder, substantially as described.

In testimony whereof we affix our signatures in presence of two witnesses.

ARTHUR B. FARQUHAR.
HENRY W. EISENHART.
SAMUEL S. MORTON.

Witnesses:
J. HERMAN STALLMAN,
F. J. EVANS.